(12) United States Patent
Frantz et al.

(10) Patent No.: US 12,515,414 B2
(45) Date of Patent: *Jan. 6, 2026

(54) METHODS AND SYSTEM FOR A HOMOGENEOUS DENTAL APPLIANCE (71) Applicants: Joseph Frantz, Bastrop, TX (US); Donald Frantz, Pasadena, TX (US); Philip Bocala, San Diego, CA (US); Dane Kinchen, Hammond, LA (US)

(72) Inventors: Joseph Frantz, Bastrop, TX (US); Donald Frantz, Pasadena, TX (US); Philip Bocala, San Diego, CA (US); Dane Kinchen, Hammond, LA (US)

(73) Assignee: Frantz Design Incorporated, Katy, TX (US)

( * ) Notice: Subject to any disclaimer, the term of this patent is extended or adjusted under 35 U.S.C. 154(b) by 193 days.

This patent is subject to a terminal disclaimer.

(21) Appl. No.: 18/399,958

(22) Filed: Dec. 29, 2023

(65) Prior Publication Data

US 2024/0131803 A1    Apr. 25, 2024

Related U.S. Application Data

(63) Continuation-in-part of application No. 18/144,035, filed on May 5, 2023, and a continuation-in-part of
(Continued)

(51) Int. Cl.
*A61F 5/56*    (2006.01)
*B29C 51/10*    (2006.01)
(Continued)

(52) U.S. Cl.
CPC .............. *B29C 65/08* (2013.01); *A61F 5/566* (2013.01); *G16H 40/67* (2018.01); *B29L 2031/753* (2013.01)

(58) Field of Classification Search
CPC .... A61F 5/566; A61F 5/58; A61F 5/56; A61F 2005/563; A61C 7/08; A61C 19/063;
(Continued)

(56) References Cited

U.S. PATENT DOCUMENTS

6,109,265 A * 8/2000 Frantz .................... A61F 5/566
128/848
7,637,262 B2 * 12/2009 Bailey .................... A61F 5/566
128/848
(Continued)

*Primary Examiner* — Tarla R Patel
(74) *Attorney, Agent, or Firm* — Glenn Gold, P.A.; Glenn E. Gold (57) ABSTRACT

Methods and systems relate to receiving oral characteristic data of a patient, processing the oral characteristic data in a server to determine dentition data and a forward mandibular position to enable the patient to breathe during sleep by opening an airway of the patient, forming a dental appliance using the dentition data and the forward mandibular position, including a lower dental tray and an upper dental tray, the upper dental tray including a pair of upper dental tray plateaus, the lower dental tray including a pair of lower dental tray plateaus, ultrasonically welding a first pair of button protrusions onto the pair of lower dental tray plateaus, and ultrasonically welding a second pair of button protrusions onto the upper dental tray plateaus to provide a dental when two connectors are attached to connect the upper dental tray to the lower dental tray.

17 Claims, 8 Drawing Sheets

Related U.S. Application Data application No. 17/467,198, filed on Sep. 4, 2021, now Pat. No. 11,857,456.

(51) Int. Cl.

| | |
|---|---|
| *B29C 51/46* | (2006.01) |
| *B29C 64/00* | (2017.01) |
| *B29C 64/112* | (2017.01) |
| *B29C 64/118* | (2017.01) |
| *B29C 64/386* | (2017.01) |
| *B29C 65/08* | (2006.01) |
| *B29C 69/00* | (2006.01) |
| *B29K 105/00* | (2006.01) |
| *B29L 31/00* | (2006.01) |
| *B33Y 10/00* | (2015.01) |
| *B33Y 30/00* | (2015.01) |
| *B33Y 50/02* | (2015.01) |
| *G16H 40/67* | (2018.01) |

(58) Field of Classification Search
CPC ... A61B 5/4547; A61B 5/4552; A61B 5/4557; A61B 5/682; A61B 5/0534; A63B 71/085; A63B 2071/086; A63B 2017/088; B29C 64/00; B29C 64/386; B29C 69/001; B29C 64/118; B29C 64/112; B29C 51/10; B29C 51/46; B33Y 10/00; B33Y 30/00; B33Y 50/02; B29K 2105/256; B29L 2031/753

See application file for complete search history.

(56) References Cited

U.S. PATENT DOCUMENTS

2009/0032030 A1* 2/2009 Callender ............... A61F 5/566
                                                                128/845
2009/0036889 A1* 2/2009 Callender ............... A61F 5/566
                                                                606/55

* cited by examiner

METHODS AND SYSTEM FOR A HOMOGENEOUS DENTAL APPLIANCE

CROSS-REFERENCE TO RELATED APPLICATIONS

The present application is a continuation-in-part of application Ser. No. 17/467,198, entitled "Methods and System for Homogeneous Dental Appliance," filed Sep. 4, 2021, and application Ser. No. 18/144,035, entitled "Adjustable Thermoplastic Dental Appliance System and Method" filed May 5, 2023 and claims benefit under 35 U.S.C. § 119(e) from, U.S. Provisional Patent Application Ser. No. 62/679,007, entitled "Methods and System for Homogeneous Dental Appliance," filed May 31, 2018, which is hereby incorporated by reference in its entirety.

BACKGROUND

Sleep apnea and obstructive sleep apnea treatments include surgery, positive airflow machinery, such as CPAP machines, and dental appliances. One known dental appliance is the "Elastic Mandiblular Advancement" (EMAC)) and related appliances. The EMA® appliance operates by providing increased airflow by forward mandibular advancement. One problem with the EMA® appliance is the risk that button protrusions that attach to elastic bands on each side of the appliance will detach from the appliance. One method of attaching the button protrusions on each side of the appliance includes cementing. However, cementing the button protrusions can result in detachment over time and with increased use. What is needed is a dental appliance that has a lower risk of button protrusion detachment.

SUMMARY

Some embodiments of a system and method may include receiving oral characteristic data of a patient, processing the oral characteristic data in a server to determine dentition data, and a forward mandibular position to enable the patient to breathe during sleep by opening an airway of the patient, forming a dental appliance using the dentition data and the forward mandibular position, the dental appliance including a lower dental tray and an upper dental tray, each of the lower dental tray and the upper dental tray being homogeneous, the upper dental tray including a pair of upper dental tray plateaus, the lower dental tray including a pair of lower dental tray plateaus, ultrasonically welding a first pair of button protrusions onto the pair of lower dental tray plateaus, and ultrasonically welding a second pair of button protrusions onto the upper dental tray plateaus to provide a homogeneous dental appliance with the first pair of button protrusions and the second pair of button protrusions providing the forward mandibular position when two connectors are attached to connect the upper dental tray to the lower dental tray.

In one or more embodiments, the upper and lower dental trays are thermoformed using one or more of a thermoplastic polyester, polyethylene terephthalate glycol (PETG), an Ethylene Propylene Copolymer, Polyoxymethlene Copolymer, a thermoplastic olefin, thermoplastic polyolefin, or olefinic thermoplastic elastomer.

In one or more embodiments, the upper and lower dental trays are thermoformed using one or more of acrylic, Acrylonitrile butadiene styrene (ABS), nylon, polylactic acid (PLA), Polybenzimidazole, Polycarbonate. Polyether sulfone, Polyoxymethylene, Polyether ether ketone, Polyetherimide, Polyethylene, Polyphenylene oxide, Polyphenylene sulfide, Polypropylene, Polystyrene, Polyvinyl chloride, Polyvinylidene fluoride, and Polytetrafluoroethylene.

In one or more embodiments, the ultrasonic welding includes, for each pair of button protrusions of the upper and lower dental tray, inserting the respective button protrusion into an sonotrode, each button protrusion being chemically compatible or identical in material to the upper and lower dental tray, placing the sonotrode at the respective plateau for the respective button protrusion according to the dentition data, vibrating the sonotrode via an ultrasonic transducer vertically between 20 kHz and 40 kHz times per second for a predetermined weld time to reach a melting point, maintaining a predetermined amount of hold time to allow fusing and hermeticity, and retracting the sonotrode after the hold time.

In one or more embodiments, receiving oral characteristic data of a patient includes scanning by a scanner of an oral cavity of the patient, imaging the oral cavity to determine the dentition data, wherein the oral characteristic data includes dentition data as one or more images of teeth and a gum line of the patient, and transmitting the oral characteristic data to a server.

In one or more embodiments, the lower dental tray is inclusive of a first vertical displacement bite pad on a left side of the lower dental tray and a second vertical displacement bite pad on a right side of the lower dental tray wherein a height of each of the first and second vertical displacement bite pads is determined according to the oral characteristic data, the oral characteristic data providing soft tissue data of the patient indicative of airway function.

One or more embodiments is directed another system and method including receiving, by a server, one or more data sets associated with a patient, determining, by the server one or more positions for placement of button protrusions based on the received data sets from a scanner, the received data sets including at least a dentition pattern, communicating, by the server the one or more positions for placement of button protrusions, the communicating including assigning a value associated with each of the one or more positions for placement of button protrusions, each value representative of a distance between an upper tray button protrusion and a respective lower tray button protrusion for mandibular advancement, transmitting the value data to an injection molding apparatus, forming a dental appliance using the value associated with each of the one or more positions for placement of button protrusions to determine a location for a plurality of plateaus for use by an ultrasonic welder, the dental appliance including a lower dental tray and an upper dental tray, the forming including ultrasonically welding the first pair of button protrusions onto a pair of lower dental tray plateaus of the plurality of plateaus on the lower dental tray, and ultrasonically welding the second pair of button protrusions onto a pair of upper dental tray plateaus of the plurality of plateaus to provide a homogeneous dental appliance with the first pair of button protrusions and the second pair of button protrusions providing the forward mandibular position when two connectors are attached to connect the upper dental tray to the lower dental tray.

In one or more embodiments, the ultrasonic welding includes for each button protrusion of the upper and lower button protrusions, inserting the respective button protrusion into an ultrasonic horn, each button protrusion being chemically compatible or identical in material to the upper and lower dental tray, placing the ultrasonic horn at a predetermined location for the respective button protrusion according to the dentition data, vibrating the ultrasonic horn via an ultrasonic transducer vertically between 20 kHz and 40 kHz times per second for a predetermined weld time to reach a melting point, maintaining a predetermined amount of hold time to allow fusing and hermeticity, and retracting the horn after the hold time.

In one or more embodiments, the lower dental tray is inclusive of a first vertical displacement bite pad on a left side of the lower dental tray and a second vertical displacement bite pad on a right side of the lower dental tray wherein a height of each of the first and second vertical displacement bite pads is determined according to the oral characteristic data, the oral characteristic data providing soft tissue data of the patient indicative of airway function.

In one or more embodiments, the vertical displacement is provided by one or more of a pair of bite pads ultrasonically welded on the lower dental tray.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Figure 1A:
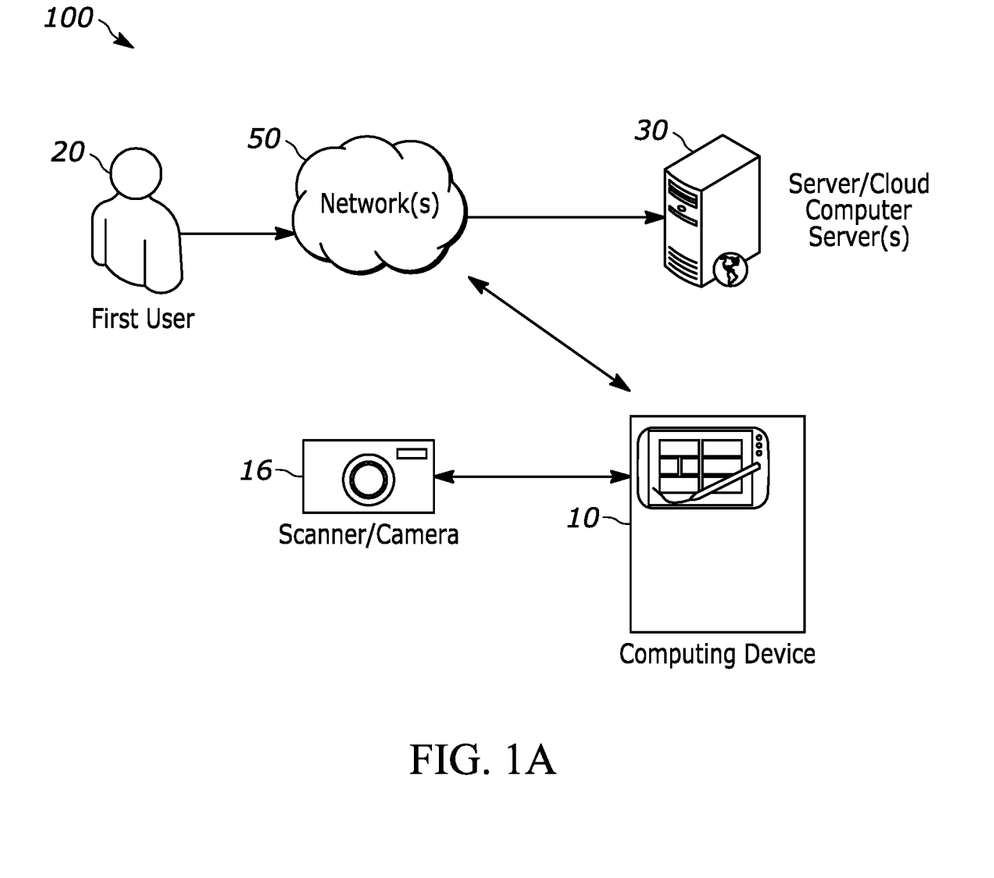
FIG. 1A illustrates a system and network environment including a computing device in accordance with one or more embodiments of the present disclosure.

Referring now to FIG. 1A, the figure illustrates a computing device 10 connected via a network interface to a computer server 30 in an exemplary environment 100. As will be further described herein the illustrated computing device 10 and computer server 30 may employ the computationally implemented methods, systems, and articles of manufacture in accordance with various embodiments. The computing device 10 and computer server 30, in various embodiments, enable functions of the computing device 10.

Computing device 10 illustrated in FIG. 1A can be a tablet computer, in alternative embodiments, the computationally implemented methods, systems, and articles of manufacture in accordance with various embodiments may be embodied in other types of computer systems having other form factors including other types of portable computing devices such as, for example, mobile telephones, laptops, smartphones, e-readers, and so forth. Computing devices can include smartphones, client computers and the like as possible computing devices. As illustrated, the computing device 10 can include a display, such as a touchscreen as input/output of the computing device 10. Computing device 10 can further include a keyboard, either as a touch input/output keyboard or as an attached keyboard. As further depicted, the computing device 10 may also be connected to a scanner 16. In one embodiment, scanner 16 can be a scanning camera capable of creating a 3D image of teeth.

Figure 1B:
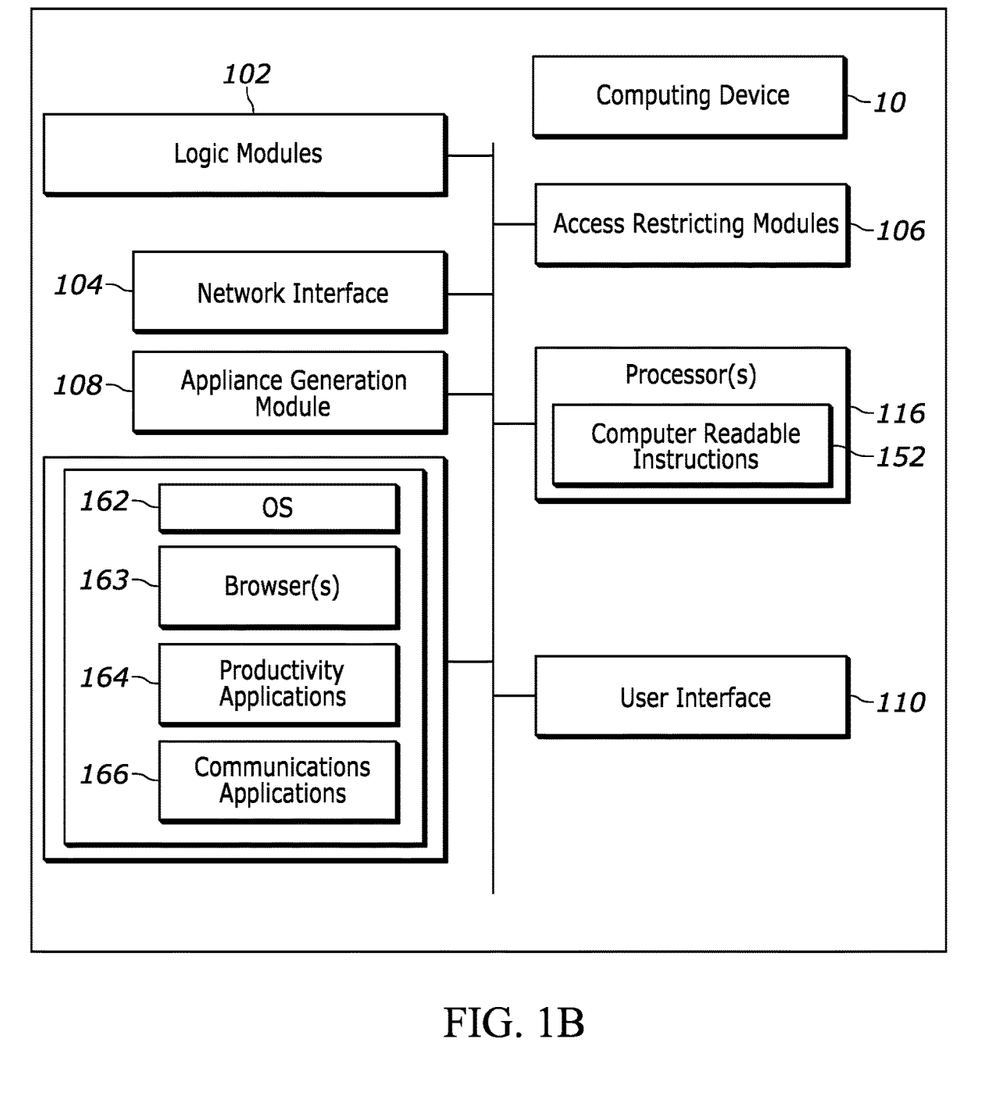
FIG. 1B illustrates a processor and a computing device in accordance with one or more embodiments of the present disclosure.

Referring now to FIG. 1B, computing device 10 is further illustrated with logic modules 102, network interface 104, user interface 110, processors 116 and memory 114. Logic modules 102 can be implemented using circuit components such as ASIC, logic modules 102 and other modules shown, may be implemented using a combination of specifically designed circuitry such as ASIC and one or more processors 116 (or other types of circuitry such as field programmable gate arrays or FPGAs) executing computer readable instructions 152. For example, in some embodiments, at least one of the logic modules may be implemented using specially designed circuitry (e.g., ASIC) while a second logic module may be implemented using a processor 116 (or other types of programmable circuitry such as an FPGA) executing computer readable instructions 152 (e.g., software and/or firmware). System requirements could dictate a combination of software and firmware and circuitry to meet the embodiments herein, for example, logic modules could be designed to use the most efficient combination of software/hardware/firmware in order to quickly implement methods and systems within the scope of the present disclosure. In some embodiments, a Computer-Aided Design/Computer-Aided Manufacture (CAD/CAM) program operates to implement methods herein for forming a dental appliance from scanned images. For example, a CAD program can create data in a three-dimensional format and transmit the data to a manufacturing device, such as a 3D printer, milling machine, or injection mold creation device. Methods herein include using patient-oriented oral characteristic data to determine placement of button protrusions and vertical displacement automatically by categorizing a patient's sleep apnea needs according to soft tissue characteristics and dentition. Soft tissue as described herein refers to soft palate, gum line, uvula placement as well as hyoid tissue and the like in an oral cavity of a patient.

In various embodiments, the memory 114 of the computing device 10 may comprise of one or more of mass storage device, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices. In various embodiments, the one or more applications 160 stored in memory 114 may include, for example, an operating system 162, a browser(s) 163, and one or more productivity applications 164 such as a word processing application or an imaging application, scanning application and one or more communication applications 166.

Computing device 10 may also include access restricting module 106. Access restricting module 106 of the computing device 10 can be configured to restrict access via the computing device 10 or preventing one or more actions by computing device 10. Computing device 10 may also include appliance generation module 108 coupled to access restricting module 106 via a bus.

Figure 2:
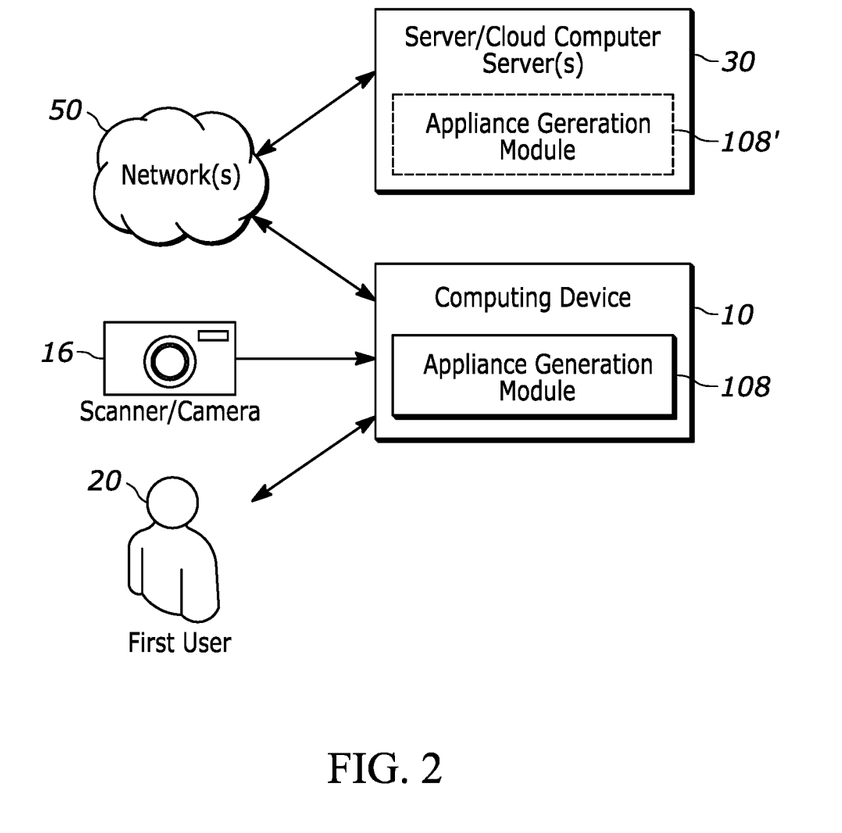
FIG. 2 illustrates a network environment in accordance with one or more embodiments of the present disclosure.

Referring to FIG. 2, appliance generation module 108 may be configured to determine that a first user 20 is an authorized user attempting to operate computing device 10. Appliance generation module 108 can also be configured to determine an established authorized user based on network received data while computing device 10 is connected to a network connection 50. In the case of appliance generation module 108, existing in a cloud computing setting or computer server 30, appliance generation module 108 may be configured to determine a network-based authorization for the first user when first logging into network 50 or cloud computing logging to computer server 30.

Appliance generation module 108 can be configured to receive inputs from a scanner 16. In some embodiments, appliance generation module 108 is coupled to a device capable of directing thermoforming of dental appliances. Appliance generation module 108 can receive CAD/CAM data or other oral characteristic data and/or dentition data to enable creation of a dental appliance in accordance with one or more embodiments herein.

Computer server 30 connecting via network 50 to the computing device 10 of FIGS. 1A and 1B can establish and/or determine a vertical displacement and a forward mandibular position for treating sleep apnea. For example, scanner 16 and/or molds of a patient's teeth can be examined and used to determine the adjustment needed for treating sleep apnea. Upper and lower trays including button protrusions can be created from molds. For instance, a patient with malocclusion and sleep apnea will require a determination via scanner 16 or other method. Each patient, depending on the results of scanned teeth or impressions for a three dimensional data file and soft tissue and patient feedback, may require a different placement of horizontal and vertical displacement for both treating sleep apnea. Vertical displacement can be by way of lower bite pads or by way of the thickness of a lower dental tray.

In one embodiment, scanner 16 scans an oral cavity of patient to image the oral cavity to determine the dentition data, including oral characteristic data as one or more images of teeth and a gum line of the patient, and transmitting the oral characteristic to a server. In one or more embodiments, the dentition data includes gum line data to enable retention of the dental appliance for the patient.

More specifically, an appliance can be better retained if the trays are designed to fit at the gum line. Thus, in some embodiments, methods herein include determining a 3 millimeter distance below a tooth crown-gingival junction on the upper dental tray unless there is a protrusive axial inclination of the incisors. For protrusive axial inclinations of incisor patients, the upper dental tray is formed to reach one third to one half the way up on the anterior teeth. The lower dental tray is formed to reach 3 millimeters below a tooth crown-gingival juncture unless a patient's mandibular incisors also have a protrusive axial inclination. For protrusive axial inclination of mandibular incisor patients, the lower dental tray is formed to reach above the tooth crown-gingival area at the anterior incisors. The gum line data is provided to form the dental trays prior to use of molds of the patient's teeth.

In one embodiment, the dentition data enable molds to be formed that may be used for thermoforming of plastics on top of the mold(s) to enable an FDA approved material such as a thermoplastic material to form an upper and lower tray adapted to fit tightly but removably over upper and lower teeth such that the lower tray creates the forward mandibular position with respect to the upper tray when connectors are releasably attached to the forward and the rearward portions of the opposite sides of the upper and lower trays, respectively, to enable the forward mandibular position of the lower tray with respect to the upper tray. Button protrusions on the lower dental tray and on the dental upper tray are arranged to enable such connectors such as elastic bands or durable nylon bands or the like to attach thereto.

One embodiment includes determining a dimension and elasticity for one or more removably attachable connector bands adapted to connect the upper and lower tray via button protrusions on each of the upper and the lower trays such that the bands create the forward mandibular position of the lower tray with respect to the upper tray. Connector bands can include a plurality of pairs of elastic bands, each pair being of different length and/or elasticity.

Figure 3:
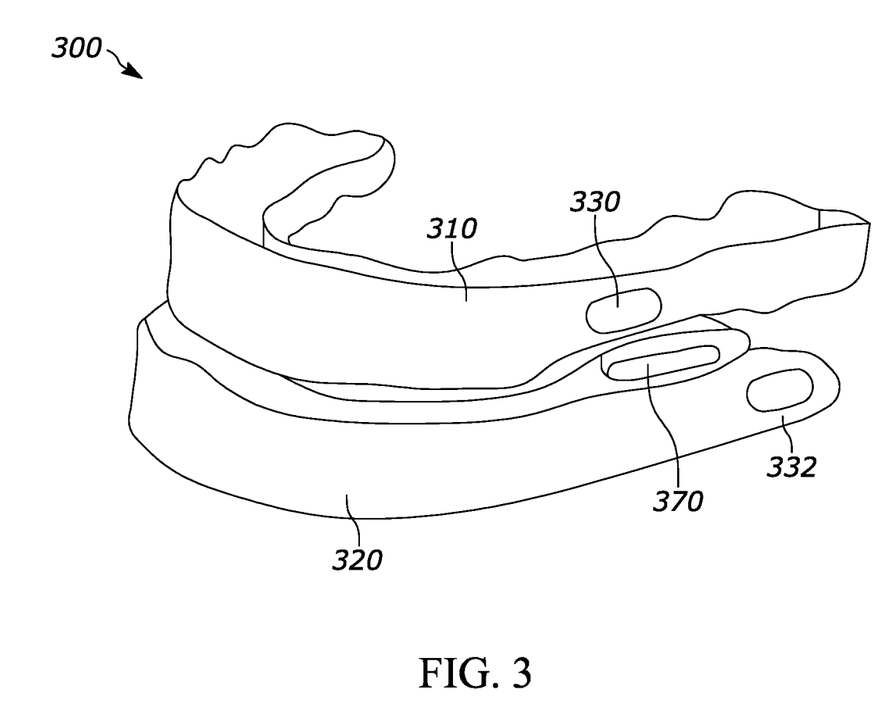
FIG. 3 illustrates a homogeneous dental appliance including button protrusions and a vertical displacement bite pad by ultrasonic welding in accordance with one or more embodiments of the present disclosure.

In one embodiment, the dental appliance is configured to be worn during sleep. Referring now to FIG. 3, the dental appliance can include upper and lower trays that are manufactured using data collection via scanning or the like, that can be sent to a three dimensional printer to create a mold of a patient's teeth. The mold may also be made using the actual patient's teeth via impressions as one of skill in the art would appreciate with the benefit of the present disclosure.

Referring now to FIG. 3, the dental appliance 300 is shown including an upper tray 310, lower tray 320, a plateau for welding upper button protrusion 350, a plateau for later welding a lower button protrusion 360 and a plateau for ultrasonic welding bite pad 370. A similar plateau for a bite pad is not shown. In one or more embodiments, bite pads may or may not be included on a dental tray. Unlike other dental appliances that have glued button protrusions and lower bite pads, embodiments herein include bite pads and/or button protrusions that are formed separately by injection molding and then attached to dental trays by ultrasonic welding. Embodiments disclose forming a dental appliance homogeneously with button protrusions and/or vertical displacement bite pads manufactured from the same or compatable materials as the dental trays themselves so that the final product is a homogeneous dental appliance. By bonding based on the melting and fusion of the material of the buttons and/or bite pads onto the dental trays via ultrasonic welding, no gluing and pressure pots are required. The time for ultrasonic welding efficiently reduces the overall time for manufacturing and the risk of detachment of components is greatly reduced.

In one or more embodiments, button protrusions 330 and bite pads 370 may be injection molded prior to being attached to a lower tray 320 and upper tray 310, and, in some embodiments prior to receiving the data of a particular patient. Such materials for bite pads and button protrusions, according to one or more embodiments, are chemically compatible and/or identical to the material used for the upper and lower dental trays. One such thermoplastic appropriate for embodiments includes thermoplastic polyester such as polyethylene terephthalate glycol (PETG), when the upper and lower dental trays are also composed of PETG. One of skill in the art will appreciate that other chemically compatible materials for both injection molding and thermoforming combined with ultrasonic welding as disclosed herein are within the scope of the present invention. Materials appropriate for dental appliances according to some embodiments are FDA approved. In some embodiments, the button protrusions can be formed via injection molding. For example, a mold can be used to form individual button protrusions for the upper and lower dental trays in advance and stored as necessary.

In some embodiments, button protrusions and different sized bite pads may be premanufactured for later ultrasonic welding onto individual patient dental trays. Thus, a dental appliance can be thermoformed and the button protrusions and/or the dental pads on the lower dental tray added later via ultrasonic welding such that button protrusions and/or bite pads are part of one homogeneous dental tray independent of later gluing or cementing of the button protrusions and bite pads. Advantageously, ultrasonic welding avoids the time required for gluing and cementing by making pressure pots and the like unnecessary.

After receiving patient specific data from a scanner or impressions or the like, the upper dental tray of a dental appliance and the bottom dental tray are thermoformed over the molds of the patient's teeth. Using the patient specific data, the molds include a plurality of plateaus for enabling ultrasonic welding of the button protrusions onto thermoformed dental trays. For example, the patient specific data may indicate a location for button protrusions appropriate for providing advancement of the mandible to prevent snoring or sleep apnea.

In one embodiment, the plateaus thermoformed as part of the upper and lower dental trays enable ultrasonically welding a first pair of button protrusions onto a pair of lower dental tray plateaus of the plurality of plateaus on the lower dental tray, and ultrasonically welding the second pair of button protrusions onto a pair of upper dental tray plateaus of the plurality of plateaus. By ultrasonically welding chemically compatible button protrusions onto the dental trays, the system and method produces a homogeneous dental appliance with the first pair of button protrusions and the second pair of button protrusions providing forward mandibular position when two connectors are attached to connect the upper dental tray to the lower dental tray. The two connectors, in one embodiment may be elastic bands, nylon bands or the like.

In embodiments, materials appropriate for injection molding the protrusion buttons, bite pads, and also thermoforming dental trays with plateaus may be any compatible thermoplastic that may also be ultrasonically welded including resin-type materials and materials described in U.S. Pat. No. 9,682,018 to Sadowsky et al., Jun. 20, 2017, "Denture Tooth and Material" which is hereby incorporated by reference in its entirety. Appropriate materials for resins is further described in Tanaka J, Hashimoto T., Stansbury J W, Antonucci J M, Suzuki K., "Polymer Properties of Resins Composed of UDMA an Methacrylates With the Carboxyl Group" Dental Material Journal 2001; 10:206-215, which incorporated by reference herein in its entirety.

In one or more embodiments, the materials used may include Ethylene Propylene Copolymers having the following properties as shown in Table 1:

TABLE 1

| Physical | Test Method | Nominal Value Unit |
| --- | --- | --- |
| Density-Specific Gravity (Method B) | ASTM D792 | .902 sp gr 23/23° C. |
| Melt Mass-Flow Rate | ASTM D1238 | 40 g/10 min |

TABLE 1-continued

| Physical | Test Method | Nominal Value Unit |
| --- | --- | --- |
| (MFR) Mechanical | | |
| Tensile Strength @ Yield | ASTM D638 | 4060 psi |
| Tensile Elongation @ Yld | ASTM D638 | 12.00% |
| Flexural Modulus (Procedure A) | ASTM D790 | 1% Secant: 145000 psi |
| Impact | | |
| Notched Izod Impact (73° F.) | ASTM D256 | .0899 ft lb/in |
| Thermal | | |
| DTUL @ 66 psi- Unannealed | ASTM D648 | 194° F. |
| Optical | | |
| Haze | ASTM D1003 | 6.00% |

In another embodiment, the injection molding and thermoforming material suitable for ultrasonic welding to a dental tray can be provided by a Polyoxymethlene Copolymer with the following properties shown in Table 2:

TABLE 2

| Physical | Test Method | Nominal Value Unit |
| --- | --- | --- |
| Specific Gravity | ASTM D792 | 1.41 |
| Melt Mass-Flow Rate (MFR) Mechanical | ASTM D1238 | |
| Tensile Strength | ASTM D638 | 8800 psi |
| Tensile Elongation | ASTM D638 | 60.00% |
| Flexural Modulus | ASTM D790 | $.38 \text{ psi} \times 10^6$ |
| Impact | | |
| Impact Strength, Izod, notched 1/8 in (3.18 mm) section | ASTM D256 | 1 ft-lb/in |
| Thermal | | |
| Deflection Temperature @ 264 psi (1.82 Mpa) | ASTM 648 | |
| Deflection Temperature @ 66 psi (0.45 Mpa) | ASTM D648 | 315 |

Other materials appropriate for embodiments include acrylic, Acrylonitrile butadiene styrene (ABS), nylon, polylactic acid (PLA), Polybenzimidazole, Polycarbonate. Polyether sulfone, Polyoxymethylene, Polyether ether ketone, Polyetherimide, Polyethylene, Polyphenylene oxide, Polyphenylene sulfide, Polypropylene, Polystyrene, Polyvinyl chloride, Polyvinylidene fluoride, and Polytetrafluoroethylene (Teflon).

Figure 4:
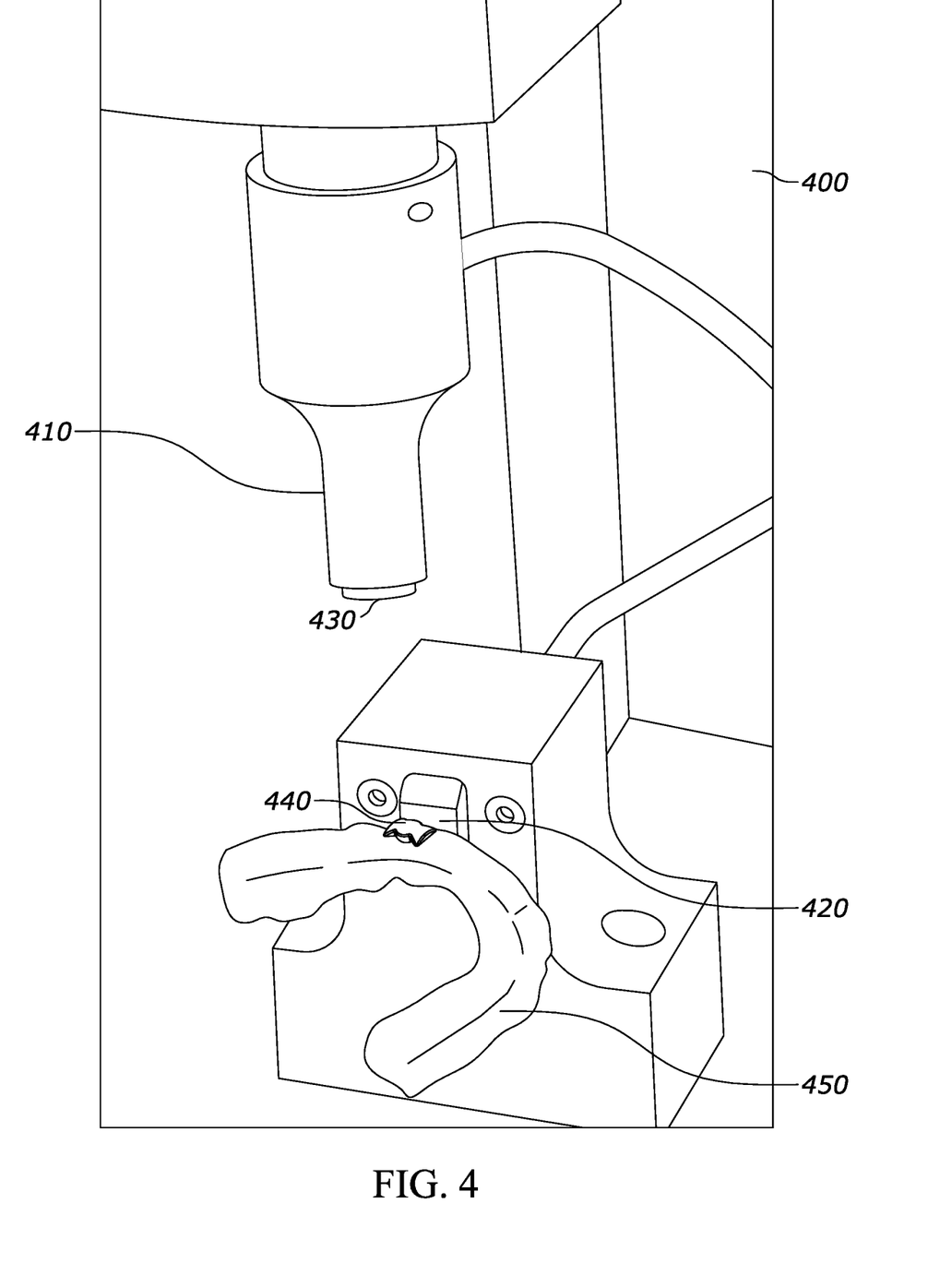
FIG. 4 illustrates an ultrasonic welding device with a dental appliance having button protrusions welded onto the appliance in accordance with one or more embodiments of the present disclosure.

Referring now to FIG. 4 an ultrasonic welder 500 is illustrated appropriate for welding button protrusions on to a dental appliance. As shown, sonotrode 410 or "horn" and fixture 420 are designed to hold a button protrusion (or bite pad) by inserting a separate button protrusion 430 into a depression, securing the button protrusion welded onto a dental tray as button protrusion 440 onto dental tray 450. The fixture 420 is shown holding a dental tray 450 with an exemplary button protrusion 440 ultrasonically welded onto the dental tray to form a homogeneous tray due to the compatible chemical properties of the components forming a joining that essentially melts the two compatible thermoplastics to create a secure homogeneous bond.

Figure 5:
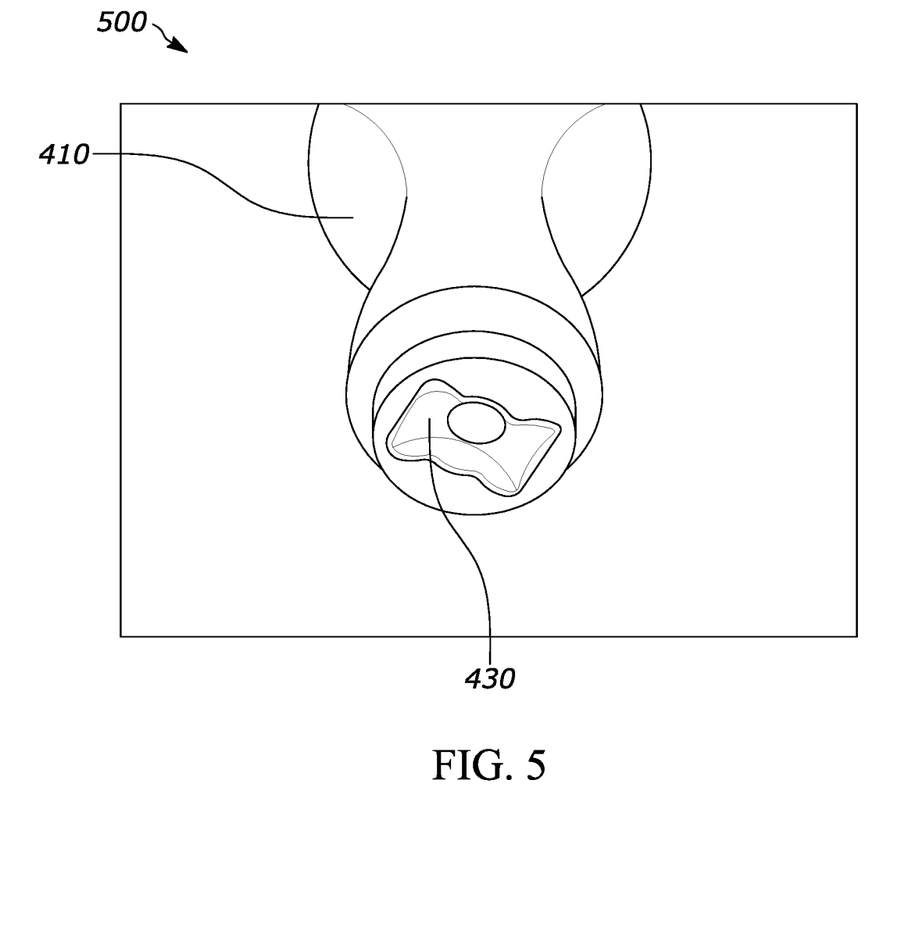
FIG. 5 illustrates a view of a sonotrode appropriate for holding a button protrusion for ultrasonic welding in accordance with one or more embodiments of the present disclosure.

Referring to FIG. 5, a close up view 500 illustrates sonotrode 410 according to one embodiment. As shown depression 430 illustrates where a button protrusion may be placed for ultrasonic welding. The button protrusion, as shown, can be any shape appropriate for securing a connector. For example, some button protrusions may be hook like. Other button protrusions may be designed to work with specific connectors or generic connectors. For example, elastic bands may be pliable enough to connect many different types of button protrusions.

Figure 6:
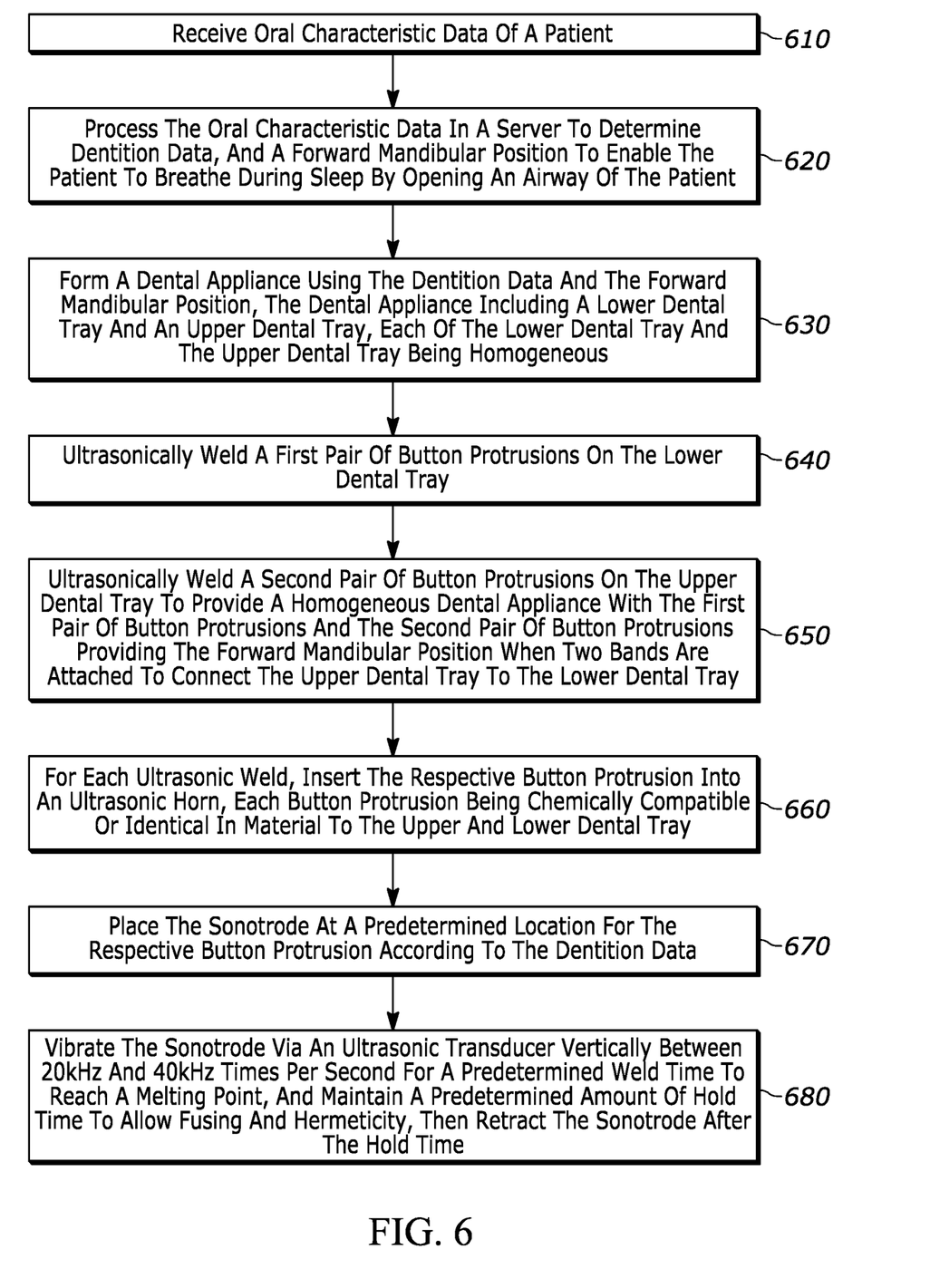
FIG. 6 illustrates a flow diagram of a method in accordance with one or more embodiments of the present disclosure.

Referring to FIG. 6, a flow diagram illustrates a method according to embodiments. More particularly, with reference to FIGS. 1A, 1B, and 2 the method 600 includes at 610 receiving oral characteristic data of a patient. For example a scanner 16 may collect data and provide it to cloud 30 for sending to an appliance generation module 108. Block 620 provides for processing the oral characteristic data in a server 30 to determine dentition data, and a forward mandibular position to enable the patient to breathe during sleep by opening an airway of the patient. Block 630 provides for forming a dental appliance using the dentition data and the forward mandibular position, the dental appliance including a lower dental tray and an upper dental tray, each of the lower dental tray and the upper dental tray being homogeneous. For example, the dentition data received via cloud 30 may be used to form a mold of an upper and lower dental tray as shown in FIG. 3, with plateaus 330, 332 and 370 for receiving button protrusions and bite pads via ultrasonic welding.

Block 640 provides for ultrasonically welding a first pair of button protrusions on the lower dental tray. For example as shown in FIG. 4 ultrasonic welder 400 may be used to weld button protrusions onto plateaus 330, 332 and/or 370 generated by thermoforming upper and lower dental trays.

Block 650 provides for ultrasonically welding a second pair of button protrusions on the upper dental tray to provide a homogeneous dental appliance with the first pair of button protrusions and the second pair of button protrusions providing the forward mandibular position when two bands are attached to connect the upper dental tray to the lower dental tray. For example as shown in FIG. 4, ultrasonic welder 400 may be used to weld button protrusions.

Block 660 provides for each ultrasonic weld, inserting the respective button protrusion into an ultrasonic horn, each button protrusion being chemically compatible or identical in material to the upper and lower dental tray. For example, sonotrode 410 includes a depression for insertion of a button protrusion.

Block 670 provides for placing the sonotrode at a predetermined location for the respective button protrusion according to the dentition data. For example the predetermined location may be a plateau 430 or 432 appropriate for welding a button thereto.

Block 680 provides for vibrating the sonotrode via an ultrasonic transducer vertically between 20 kHz and 40 kHz times per second for a predetermined weld time to reach a melting point, and maintaining a predetermined amount of hold time to allow fusing and hermeticity, then retracting the sonotrode after the hold time. As shown in FIG. 4, the ultrasonic welder 400 may quickly fuse thermoplastics together.

Figure 7:
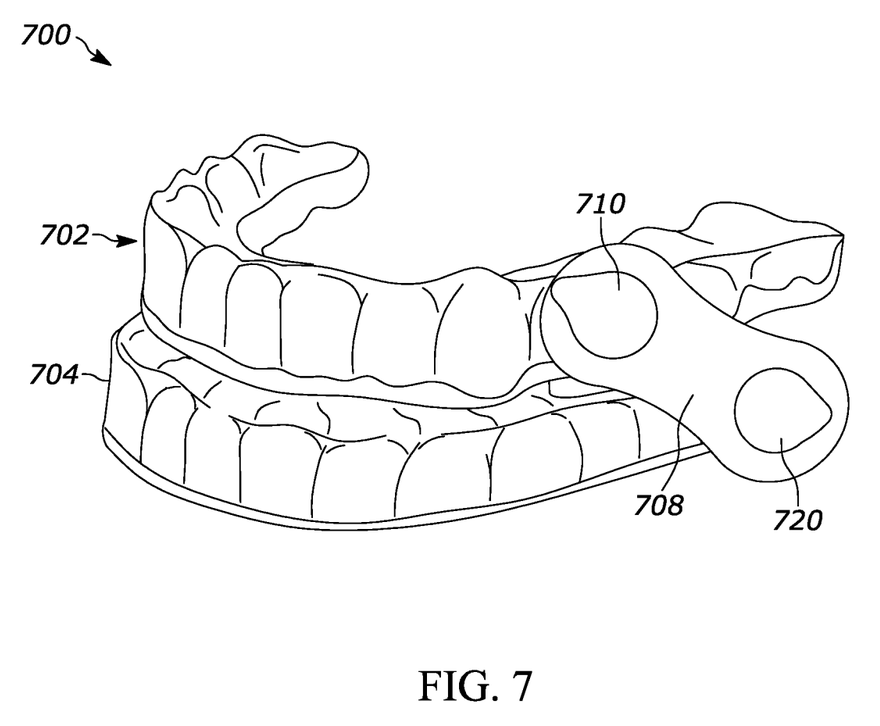
FIG. 7 illustrates a perspective view of a dental appliance with button protrusions and/or vertical bite pads ultrasonically welded thereon.

Referring now to FIG. 7, dental appliance 700 is illustrated as a final product after ultrasonically welding button protrusions and/or bite pads on an upper dental tray 702 and lower dental tray 704. Connectors 708 may be nylon or elastic bands connecting either side of the dental appliance connecting button protrusion button 710 and 720.

The resulting dental appliance, from injection molding button protrusions and/or bite pads and ultrasonically welding the buttons and bite pads onto unique upper and lower dental tray according to dentition data of a patient, beneficially provides a homogeneous dental appliance without risking the detachment of from glues and shortening the time of manufacture. Prior methods required different components such as button protrusions and bite pads to be added by gluing or the like or encased in a thermoforming method.

SUMMARY

As described above, a dental appliance is formed by, in one or more embodiments, a method including receiving oral characteristic data of a patient, processing the oral characteristic data in a server to determine dentition data, a vertical displacement and a forward mandibular position to enable the patient to breathe during sleep by opening an airway of the patient; forming a dental appliance using the dentition data and the forward mandibular position, the dental appliance including a lower dental tray and an upper dental tray, each of the lower dental tray and the upper dental tray being homogeneous, the upper dental tray including a pair of upper dental tray plateaus, the lower dental tray including a pair of lower dental tray plateaus, ultrasonically welding a first pair of button protrusions onto the pair of lower dental tray plateaus; and ultrasonically welding a second pair of button protrusions onto the upper dental tray plateaus to provide the homogeneous dental appliance with the first pair of button protrusions and the second pair of button protrusions providing the forward mandibular position when two connectors are attached to connect the upper dental tray to the lower dental tray.

In one or more embodiments receiving oral characteristic data of the patient includes scanning by a scanner or camera to create a mold of teeth of the patient and transmitting the oral characteristic data to a server.

In one or more embodiments receiving oral characteristic data of a patient includes scanning by a scanner of an oral cavity of the patient, imaging the oral cavity to determine the dentition data, wherein the oral characteristic data includes dentition data as one or more images of teeth and a gum line of the patient and transmitting the oral characteristic to a server.

Computer server 30 connecting via network 50 to the computing device 10 of FIG. 1A can establish and/or determine a vertical displacement and a forward mandibular position for treating sleep apnea. For example, scanner 16 and/or molds of a patient's teeth can be examined and used to determine the adjustment needed for treating sleep apnea. Upper and lower chassis including button protrusions can be created from molds and injection molded prior to reformable thermoplastic layers are injection molded as an overmolding. For instance, a patient with malocclusion and sleep apnea will require a determination via scanner or other method. Each patient, depending on the results of scanned teeth and soft tissue and patient feedback, may require a different placement of horizontal and vertical displacement for both treating sleep apnea. Vertical displacement can be by way of lower bite pads or by way of the thickness of a lower dental tray.

In some embodiments, the elastic straps can be of different lengths and strengths to enable a gradual and incremental titration to advance the mandible forward, for example some are 21 mm long but may be softer or stronger elastic. In some embodiments, 9 different lengths may be offered and four different strengths may be offered for patient comfort and efficacy.

In one or more embodiments, bite pads can be snap-on type bite pads according to a determined amount of vertical component required for a patient with sleep apnea, or height of bite pads for the dental appliance as a function of the shape of the soft palate. In other embodiments, the vertical displacement is determined by the soft tissue of the patient, such as the hyoid shape. In one or more embodiments, a scanner and/or camera such as scanner/camera detects shape of soft palate. The data is collected as oral characteristic data and provided to a processor which operates to classify the oral characteristics for fabrication of the upper and lower dentition appliance chassis.

In one or more embodiments, there are three classifications for a soft palate: short, normal or long. Thus, in one or more embodiments, a method includes determining if the posterior edge of the soft palate is short. For example, if there is 5 to 7 mm of space between the posterior edge of the soft palate to the posterior wall of the oral pharynx, the soft palate is determined to be short, and a dental appliance will need 5 to 7 mm of vertical displacement. In some embodiments, to determine the vertical displacement, a scanner can measure the distance from the gingival-tooth crown juncture of the maxillary central to the gingival-tooth crown juncture of the mandibular central. If this distance is, for example, 20 mm and, thus, 7 mm of vertical is desired, in some embodiments, a vertical displacement can be determined such that the bite will have 7 mm of vertical displacement.

In some embodiments, a method includes determining if the posterior edge of the soft palate is longer than a normal soft palate. If the soft palate is longer such that the posterior edge of the soft palate has 3 to 4 mm of space between it and the posterior wall of the oral pharynx, in some embodiments, a dental appliance can be made to provide 8 to 10 mm of vertical displacement to keep the soft palate from closing the airway when the patient in a supine position.

If the soft palate is very long and webbed shaped with just 2 mm or less of space between the soft palate and the posterior wall of the oral pharynx, the appliance will likely require 11 to 14 mm of vertical, displacement.

In one or more embodiments, a scanner 16 determines whether a soft palate is short, long or normal and determines the placement of the uvula with respect to the palate.

Determining the placement and size of the lower dental tray bite pads is a function of the length of the palate of a patient. Additionally, in some embodiments, maxillary button protrusions on an upper dental tray are placed on each incisal edge, in the embrasure between the right and left cuspids and first bicuspids.

The placement of the mandibular button protrusions (lower dental tray button protrusions) can be determined by determining a patient's range of motion. In some embodiments, a scanner detects maximal range of motion by measuring before and after extension of the lower jaw. For example, if the patient has only 5-7 mm of potential advancement, the buttons are placed 23 mm apart with the patient's teeth in centric. If the patient has 7-10 mm of potential advancement, the buttons are placed 25 mm apart, and if the patient has 10-17 mm of potential advancement, the buttons are placed 27 mm apart.

In one or more embodiments, a method includes determining the location of the buttons on the mandibular arch by occluding the patient's models in centric and placing the center of the mandibular button 23, 25, or 27 mm from the center of the maxillary button.

As described above, a scanner/camera 16 takes images/scans of a patient's mouth to determine dentition data and/or soft palate data and a computer system coupled to the scanner or processor incorporated into a scanner/camera determines the placement of the button protrusions and bite pads on the upper and lower dental appliance dental trays.

In one or more embodiments receiving oral characteristic data of the patient includes scanning by a scanner or camera a mold of the teeth; and transmitting the oral characteristic data to a server.

In one or more embodiments receiving oral characteristic data of a patient includes scanning by a scanner of an oral cavity of the patient; imaging the oral cavity to determine the dentition data, wherein the oral characteristic data includes dentition data as one or more images of teeth and a gum line of the patient and one or more images of a soft palate of the patient; and transmitting the oral characteristic to a server.

In one or more embodiments determining the oral characteristic data and vertical displacement is a function of a shape of the soft palate of the patient.

In one or more embodiments the determining via the oral characteristic the vertical displacement as a function of the shape of the soft palate of the patient includes determining a vertical displacement of between 5 and 7 millimeters if the soft palate has between 5 to 7 millimeters of space between a posterior edge of the soft palate to a posterior wall of an oral pharynx of the patient. The determining via the oral characteristic data the vertical displacement may be as a function of the shape of the soft palate of the patient including processing the oral characteristic data to measure a distance from a gingival-tooth crown juncture of a maxillary central to a gingival-tooth crown juncture of a mandibular central.

In one or more embodiments the determining via the oral characteristic data the vertical displacement may include determining as a function of the shape of the soft palate of the patient whether a posterior edge of the soft palate is longer than a normal soft palate with between 3 and 5 millimeters of space between a posterior edge of the soft palate to a posterior wall of an oral pharynx of the patient, and providing the vertical displacement of between 8 and 10 millimeters.

The oral characteristic data may include determining if a posterior edge of the soft palate is longer than a normal soft palate and webbed and wherein two millimeters or less of space exists between the soft palate and a posterior wall of an oral pharynx, providing at least 11 to 14 millimeters for the vertical displacement. Further, the oral characteristic data may provide a vertical displacement as a function of the shape of the soft palate of the patient includes determining whether the soft palate is one of short, normal, and long.

In one or more embodiments the lower dental tray is inclusive of a first vertical displacement bite pad on a left side of the lower dental tray and a second vertical displacement bite pad on a right side of the lower dental tray wherein a height of each of the first and second vertical displacement bite pads is determined according to the oral characteristic data, the oral characteristic data providing soft tissue data of the patient indicative of airway function.

In one or more embodiments, the lower dental tray couples to the upper dental tray via two connectors as elastic bands coupled to either side of the dental appliance via the button protrusions. The elastic bands can include a plurality of pairs of elastic bands, each pair being of different length and/or elasticity.

Some embodiments of a method may include, forming an upper dental appliance chassis including at least two plateaus for upper appliance button protrusions; forming a lower dental appliance chassis including at least two plateaus for lower appliance button protrusions and at least two plateaus for vertical displacement bite pads, and ultrasonic welding the button protrusions and bite pads In one or more embodiments, the method includes forming a dental appliance including the lower dental tray and an upper dental tray, each of the lower dental tray and the upper dental tray, the lower dental tray inclusive of the at least two vertical displacement bite pads and at least two lower appliance button protrusions, the upper dental tray inclusive of the at least two upper appliance button protrusions, the at least two lower appliance button protrusions and the at least two upper appliance button protrusions providing a forward mandibular position when two connectors are attached to connect the upper dental tray and the lower dental tray.

Another embodiment is directed to a system including a processor and a non-transitory computer-readable storage medium storing instructions operative when executed on the processor to perform a method including receiving oral characteristic data of a patient, processing the oral characteristic data in a server to determine dentition data, a vertical displacement and a forward mandibular position to enable the patient to breathe during sleep by opening an airway of the patient; forming a dental appliance using the dentition data and the forward mandibular position, the dental appliance including a lower dental tray and an upper dental tray, each of the lower dental tray and the upper dental tray being homogeneous, the upper dental tray including a pair of upper dental tray plateaus, the lower dental tray including a pair of lower dental tray plateaus, ultrasonically welding a first pair of button protrusions onto the pair of lower dental tray plateaus; and ultrasonically welding a second pair of button protrusions onto the upper dental tray plateaus to provide the homogeneous dental appliance with the first pair of button protrusions and the second pair of button protrusions providing the forward mandibular position when two connectors are attached to connect the upper dental tray to the lower dental tray.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware in one or more machines or articles of manufacture), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation that is implemented in one or more machines or articles of manufacture; or, yet again alternatively, the implementer may opt for some combination of hardware, software, and/or firmware in one or more machines or articles of manufacture. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware in one or more machines or articles of manufacture.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuitry (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuitry, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

What is claimed:

1. A method comprising:
receiving oral characteristic data of a patient;
processing the oral characteristic data in a server to determine dentition data, and a forward mandibular position to enable the patient to breathe during sleep by opening an airway of the patient;
forming a dental appliance using the dentition data and the forward mandibular position, the dental appliance including a lower dental tray and an upper dental tray, each of the lower dental tray and the upper dental tray being homogeneous, the upper dental tray including a pair of upper dental tray plateaus, the lower dental tray including a pair of lower dental tray plateaus; and
ultrasonically welding a first pair of button protrusions onto the pair of lower dental tray plateaus; and
ultrasonically welding a second pair of button protrusions onto the upper dental tray plateaus to provide a homogeneous dental appliance with the first pair of button protrusions and the second pair of button protrusions providing the forward mandibular position when two connectors are attached to connect the upper dental tray to the lower dental tray.

2. The method of claim 1 wherein the upper and lower dental trays are thermoformed using one or more of a thermoplastic polyester, polyethylene terephthalate glycol (PETG), an Ethylene Propylene Copolymer, Polyoxymethylene Copolymer, a thermoplastic olefin, thermoplastic polyolefin, or olefinic thermoplastic elastomer.

3. The method of claim 1 wherein the upper and lower dental trays are thermoformed using one or more of acrylic, Acrylonitrile butadiene styrene (ABS), nylon, polylactic acid (PLA), Polybenzimidazole, Polycarbonate, Polyether sulfone, Polyoxymethylene, Polyether ether ketone, Polyetherimide, Polyethylene, Polyphenylene oxide, Polyphenylene sulfide, Polypropylene, Polystyrene, Polyvinyl chloride, Polyvinylidene fluoride, and Polytetrafluoroethylene.

4. The method of claim 1 wherein the ultrasonic welding comprises, for each pair of button protrusions of the upper and lower dental tray:
inserting the respective button protrusion into an sonotrode, each button protrusion being chemically compatible or identical in material to the upper and lower dental tray;
placing the sonotrode at the respective plateau for the respective button protrusion according to the dentition data;
vibrating the sonotrode via an ultrasonic transducer vertically between 20 kHz and 40 kHz times per second for a predetermined weld time to reach a melting point;
maintaining a predetermined amount of hold time to allow fusing and hermeticity; and
retracting the sonotrode after the hold time.

5. The method of claim 1 wherein receiving oral characteristic data of a patient comprises:
scanning by a scanner of an oral cavity of the patient;
imaging the oral cavity to determine the dentition data, wherein the oral characteristic data includes dentition data as one or more images of teeth and a gum line of the patient; and
transmitting the oral characteristic data to a server.

6. The method of claim 1 wherein the lower dental tray is inclusive of a first vertical displacement bite pad on a left side of the lower dental tray and a second vertical displacement bite pad on a right side of the lower dental tray wherein a height of each of the first and second vertical displacement bite pads is determined according to the oral characteristic data, the oral characteristic data providing soft tissue data of the patient indicative of airway function.

7. The method of claim 1 further comprising:
forming the upper and lower dental trays via thermoforming over a mold generated based on the oral characteristic data of the patient; and
forming the button protrusions via injection molding prior to ultrasonic welding.

8. A system comprising a processor and a non-transitory computer-readable storage medium storing instructions operative when executed on the processor to perform the method of claim 1.

9. An apparatus comprising the dental appliance formed by the method of claim 1.

10. A method comprising:
receiving, by a server, one or more data sets associated with a patient;
determining, by the server one or more positions for placement of button protrusions based on the received data sets from a scanner, the received data sets including at least a dentition pattern;
communicating, by the server the one or more positions for placement of button protrusions, the communicating comprising:
assigning a value associated with each of the one or more positions for placement of button protrusions, each value representative of a distance between an upper tray button protrusion and a respective lower tray button protrusion for mandibular advancement;

transmitting the value data to an injection molding apparatus;

forming a dental appliance using the value associated with each of the one or more positions for placement of button protrusions to determine a location for a plurality of plateaus for use by an ultrasonic welder, the dental appliance including a lower dental tray and an upper dental tray, the forming further comprising:

ultrasonically welding the first pair of button protrusions onto a pair of lower dental tray plateaus of the plurality of plateaus on the lower dental tray; and ultrasonically welding the second pair of button protrusions onto a pair of upper dental tray plateaus of the plurality of plateaus to provide a homogeneous dental appliance with the first pair of button protrusions and the second pair of button protrusions providing the forward mandibular position when two connectors are attached to connect the upper dental tray to the lower dental tray.

11. The method of claim 10 wherein the upper and lower dental trays are thermoformed using one or more of a thermoplastic polyester, polyethylene terephthalate glycol (PETG), an Ethylene Propylene Copolymer, Polyoxymethlene Copolymer, a thermoplastic olefin, thermoplastic polyolefin, or olefinic thermoplastic elastomer.

12. The method of claim 10 wherein the upper and lower dental trays are thermoformed using one or more of acrylic, Acrylonitrile butadiene styrene (ABS), nylon, polylactic acid (PLA), Polybenzimidazole, Polycarbonate, Polyether sulfone, Polyoxymethylene, Polyether ether ketone, Polyetherimide, Polyethylene, Polyphenylene oxide, Polyphenylene sulfide, Polypropylene, Polystyrene, Polyvinyl chloride, Polyvinylidene fluoride, and Polytetrafluoroethylene.

13. The method of claim 10 wherein the ultrasonic welding comprises, for each pair of button protrusions of the upper and lower dental tray:

inserting the respective button protrusion into an sonotrode, each button protrusion being chemically compatible or identical in material to the upper and lower dental tray;

placing the sonotrode at the respective plateau for the respective button protrusion according to the dentition data;

vibrating the sonotrode via an ultrasonic transducer vertically between 20 kHz and 40 kHz times per second for a predetermined weld time to reach a melting point;

maintaining a predetermined amount of hold time to allow fusing and hermeticity; and retracting the sonotrode after the hold time.

14. The method of claim 10 wherein receiving oral characteristic data of a patient comprises:

scanning by a scanner of an oral cavity of the patient;

imaging the oral cavity to determine the dentition data, wherein the oral characteristic data includes dentition data as one or more images of teeth and a gum line of the patient; and transmitting the oral characteristic data to a server.

15. The method of claim 10 wherein the lower dental tray is inclusive of a first vertical displacement bite pad on a left side of the lower dental tray and a second vertical displacement bite pad on a right side of the lower dental tray wherein a height of each of the first and second vertical displacement bite pads is determined according to the oral characteristic data, the oral characteristic data providing soft tissue data of the patient indicative of airway function.

16. The method of claim 15 wherein the vertical displacement is provided by one or more of a pair of bite pads ultrasonically welded on the lower dental tray.

17. A system comprising a processor and a non-transitory computer-readable storage medium storing instructions operative when executed on the processor to perform the method of claim 10.

* * * * *